US 6,554,944 B1

(12) United States Patent
Peters et al.

(10) Patent No.: US 6,554,944 B1
(45) Date of Patent: Apr. 29, 2003

(54) PROCESS FOR MAKING BOWLS COMPRISING ACRYLIC PLASTICS FILLED WITH ALUMINA TRIHYDRATE

(76) Inventors: Chris R. Peters, 3026 Sandy Dr., Chico, CA (US) 95973; James E. Young, 236 Londonderry La., Getzville, NY (US) 14068

( * ) Notice: Subject to any disclaimer, the term of this patent is extended or adjusted under 35 U.S.C. 154(b) by 0 days.

(21) Appl. No.: 09/520,540

(22) Filed: Mar. 8, 2000

Related U.S. Application Data

(63) Continuation of application No. 08/985,616, filed on Dec. 5, 1997, now Pat. No. 6,083,339.
(60) Provisional application No. 60/033,576, filed on Dec. 6, 1996.

(51) Int. Cl.[7] .............................................. B29C 51/00
(52) U.S. Cl. ...................... 156/245; 156/250; 156/297; 264/154; 264/162; 264/322; 264/325
(58) Field of Search .................................. 264/119, 154, 264/162, 322, 550, 554; 156/245, 250, 297

(56) References Cited

U.S. PATENT DOCUMENTS

| | | |
|---|---|---|
| 2,444,420 A | 7/1948 | Borkland |
| 2,590,221 A | 3/1952 | Stevens |
| 3,172,928 A | 3/1965 | Johnson |
| 3,340,714 A | 9/1967 | Pohl et al. |
| 3,464,418 A | 9/1969 | Silverman |
| 3,847,865 A | 11/1974 | Duggins |
| 4,136,226 A | 1/1979 | Gilman |
| 4,239,727 A | 12/1980 | Myers |
| 4,473,673 A | 9/1984 | Williams |
| 4,958,888 A | 9/1990 | Livnah |
| 5,139,407 A | 8/1992 | Kim |
| 5,188,888 A * | 2/1993 | McReynolds ............... 428/220 |
| 5,236,658 A | 8/1993 | Ford |
| 5,253,932 A | 10/1993 | Nesovic |
| 5,304,592 A * | 4/1994 | Ghahary ..................... 524/437 |
| 5,330,262 A | 7/1994 | Peters |
| 5,340,526 A | 8/1994 | Loddeknpinge |
| 5,354,592 A | 10/1994 | Miskell |
| 5,359,817 A | 11/1994 | Fulton |
| 5,521,243 A * | 5/1996 | Minghetti et al. ........... 524/437 |
| 5,549,862 A * | 8/1996 | Vail ............................ 264/238 |
| 5,601,680 A * | 2/1997 | Kuszaj et al. ................ 156/242 |
| 5,624,517 A * | 4/1997 | Giesen et al. ................ 156/212 |
| 5,635,271 A | 6/1997 | Zafirglu |
| 5,643,666 A * | 7/1997 | Eckart et al. ................ 428/339 |
| 5,872,168 A * | 2/1999 | Katoot ........................ 524/354 |

* cited by examiner

Primary Examiner—Jan H. Silbaugh
Assistant Examiner—Edmund H. Lee

(57) ABSTRACT

Processes for producing durable three-dimensional bowls such as water basins comprising plastics preferably acrylics heavily filled with alumina trihydrate, some embodiments including visible particles such as those sometimes used for simulating nature stone. A preferred process for manufacturing the bowls of such material includes defining a flat rigid blank such as from a larger rectangular bulk sheet in the approximate top outline shape of bowl to be formed, e.g., the blank being oval for an oval bowl and circular for a circular bowl. The blank is provided a smooth side which will be the concave finished and exposed side in use. The blank is heated to a point of softening and of uniform temperature throughout, located within a molding die such as a matched molding die having a female cavity of the desired bowl shape, indexed to the die, but left generally unrestrained so that the heated blank and un-clamped edges thereof are allowed to draw inward to reduce tension loads during forming. Force is applied relatively slowly to the blank, such as from a male portion of the die, to compress the blank into the female cavity and desired bowl shape. The bowl is cooled somewhat, removed from the die, the top edge trimmed to suitable evenness, a drain hole with surrounding bevel is cut in the bowl, an overflow hole is cut near the top edge for bathroom sinks, and sanding and polishing is applied on the exposed side(s).

17 Claims, 6 Drawing Sheets

PROCESS FOR MAKING BOWLS COMPRISING ACRYLIC PLASTICS FILLED WITH ALUMINA TRIHYDRATE

NON-PROVISIONAL PATENT APPLICATION

Chris R. Peters and James E. Young, Co-Inventors; 100% of all rights of the Inventors are assigned to Transfer Flow International, Inc., assignment recordation date at the PTO is May 27, 1997 on reel/frame 8536/0584.

This application is a Rule 1.53(b) continuation of, and claiming the benefits of U.S. non-provisional application No. 08/985,616 filed Dec. 5, 1997 which claims the benefit of U.S. provisional application No. 60/033,576 filed Dec. 6, 1996 for the common matter. U.S. non-provisional application No. 08/985,616 is now U.S. Pat. No. 6,083,339 issued Jul. 4, 2000.

BACKGROUND OF THE INVENTION

1. Field of the Invention

This invention relates to bowl shaped products, and processes, equipment and materials for manufacturing bowl shaped products comprising plastics, preferably mainly acrylic plastics and including alumina trihydrate therein as a filler making up the bulk of the material by weight.

2. Description of the Related Prior Art

Kitchen, bathroom and office countertops fabricated from flat sheet stock of solid surfacing material comprising acrylics filled with alumina trihydrate such as that sold under the trademark of "Corian", manufactured by E.I. duPont de Nemours & Co., Inc. of Wilmington, Del. 19898 U.S.A., have been in use now for many years. "Corian" is a trademark of E.I. duPont de Nemours & Co., Inc. which refers to their solid surfacing material comprising acrylics filled with alumina trihydrate, alternatively referred to as aluminum trihydrate, the alumina trihydrate comprising 20 to 85 percent by weight of the solid surface material or article. Other companies are now also manufacturing and selling rigid sheet stock solid surfacing material comprising acrylics filled with alumina trihydrate for use as building materials. Solid surfacing material comprising acrylic filled with alumina trihydrate is believed to be manufactured generally in accordance with the processes and mix formulas disclosed in U.S. Pat. No. 3,847,865 issued Nov. 12, 1974 to inventor Ray Duggins and assigned to E.I. duPont de Nemours & Co., Inc. Formulas (mixes), processes and principles thereof provided in U.S. Pat. No. 3,847,865 describe that acrylic resins (polymers) filled with 20 to 85% by weight alumina trihydrate, preferably 55 to 85 percent by weight alumina trihydrate, can be the basis for producing a quality building material having many desirable attributes, and desirable attributes beyond those provided by other similar mixes of substantially other plastics families and fillers other than alumina trihydrate, as described in U.S. Pat. No. 3,847,865. Duggins states that below an approximate 20 percent fill of alumina trihydrate in the plastics provides little benefit from the filler, and above an approximate 85 percent fill of alumina trihydrate and the mix generally cannot be formed into a hardened useful material. Duggins details in the U.S. Pat. No. 3,847,865 that the acrylic plastics are the primary binder and include desirable attributes including translucent qualities, and the alumina trihydrate is preferably applied in the range of 55 to 85% by weight of the article as a important filler for achieving certain qualities, and colorants such as pigments, pigmented particles and the like can be added to the mix to achieve various visual appearances including those including visually distinguishable particles which in many cases simulate stone such as marble or those having a variegated pattern. It is also stated in the Duggins patent that various small quantities from other numerous plastics families can also be added to the acrylic and alumina trihydrate mix and for numerous reasons. Duggins also details how to form such a mix of acrylic binder with alumina trihydrate filler and colorants into material shapes by casting or extrusion to define building material shapes such as flat rigid sheet stock or to cast the fluid mixture into non-flat structures prior to solidification. The solid surfacing material today sold under the name of "Corian" is an acrylic based binder heavily filled with alumina trihydrate, possibly containing some small quantities other plastics, and in most varieties of the mix including various colorants (color providing materials) as described in the Duggins patent. It is believed that "Corian" trademark brand solid surfacing material in rigid sheet form sold today for countertop material is manufactured with an about or approximate 70% by weight fill of alumina trihydrate, i.e. approximately 70% of the product or sheet total weight, in a binder of primarily acrylic plastics and including pigments, organic and/or inorganic, (and possibly dyes in some cases for some colors) dependant upon desired visual affect. Concentrations of the alumina trihydrate between 55 and 85 percent in the plastics provides greater hardness and resistance to flame, as opposed to lower concentrations. 65% to 85% alumina trihydrate by weight is believed most suitable by us for hardness and resistance to flame. Variations of the formula, mainly in the colorants used, provide such solid surfacing material in a wide variety of different appearances in flat sheet stock for use as building materials. Solid surfacing materials of acrylic filled with alumina trihydrate are most often manufactured and sold in flat rigid sheet form, typically in 30 inch wide×12 foot lengths in thicknesses between ¼ through ¾ inches and also in metric sizes, and in many different solid colors, color design patterns, i.e., having veining of different colors or shades of colors therein, and matrix colors or appearances, i.e., clearly distinguishable granular or particle-like color variations, and in some cases appearing as various types of natural stone. Flat sheet stock of such acrylic filled with alumina trihydrate and colorants is believed to be initially cast as a thick fluid or mix, then solidified, and then for most color mixes, sanded and polished (faced) on at least the side of the sheet intended to be exposed in use, although the Duggins U.S. Pat. No. 3,847,865 also describes the material mix as extrudable as a mix prior to solidification. The facing, i.e., sanding or any like process of the cast solidified flat sheet is to mechanically remove a thin outermost surface layer or skin-layer which, generally due to settling of colorants and some upward migration of translucent materials of the mix, does not appear the same as the balance of the sheet acrylic filled with alumina trihydrate and colorants, which as will be discussed, is a problem in economically casting such material in certain colors in three-dimensional or bowl shapes since it is clearly much easier to sand a rigid flat surface compared to the rigid multiple curved surfaces of three-dimensional products. It is believed that certain colors of the acrylic filled with alumina trihydrate material, particularly the solid colors defined with very small and evenly distributed particles and colorants can be cast or extruded without the requirement of any or any significant amount of later sanding to achieve a basically finished surface and appearance, while other color mixes of the material require substantial amounts of sanding after solidification to eliminate the skin surface layer not appearing like the balance of the material. As previously stated, in the prior art, acrylic filled with alumina trihydrate has been cast, initially as a thick fluid into bowl forms for use as sinks and lavatories, some bowls cast with integrally cast countertops to define one-piece sinks/countertop units. However, three-dimensional cast bowls such as lavatories comprising acrylic filled with alumina trihydrate for mounting within a countertop are not economically obtainable in as a wide of a variety of colors and color design patterns and matrix colors as the same material in sheet form. This is believed to be due to increased difficulties in 3-D casting and finishing (sanding and polishing) compared to flat sheet formation, particularly with controlling colorant, pigment and color particle dispersement and final position thereof within the mix when the mix is fluid and pushed into and then held in a three-dimensional shaped casting mold prior to the mix solidifying, such as by catalytic action. There has been limited success, generally restricted to only certain colors, using matched mold casting of acrylic binding a filler of alumina trihydrate by forcing the mix into a bowl shaped casting cavity, then allowing or causing the material to solidify (polymerize or thermoset, such as with injection of a catalyst) prior to removing the bowl from the casting tool. It is believed significant amounts of sanding and polishing are required for most colors after the cast bowl is removed from the cast mold, and machining of at least a bottom drain hole and optionally an overflow opening is required if the bowl is to be used as a water basin. The casting process of the prior art has, however, due to colorant and or particle migration and sanding and polishing requirements, not been a completely satisfactory and economical process for producing bowls comprising acrylic plastics binding large amounts of alumina trihydrate in as wide of a variety of colors, color design patterns with color swirls and veining (venaro), and matrix colors including speckles or flakes as are available in flat sheet stock of the same material used for defining countertops.

Reasons for the growing popularity of solid surface material of acrylic filled with alumina trihydrate include the fact the material can be manufactured in flat sheet form to visually simulate certain types of stone, such as granite, jade, marble, or it can simply be manufactured in a wide variety of colors, i.e. solid colors, venaro and matrix colors not intended to or said to simulate rock or stone. The color or color design patterns or color matrix of the sheet material is also deep or full thickness in the dense material, which allows various types of router or milling work (machining) thereto for initial installation such as when installing a countertop and making a sink cut-out in the countertop. It also allows removal of imperfections such as burn marks, scratches and the like by abrasives. The material is dense, solid, non-foamed and non-laminated, and so it can be readily machined, sanded and polished. Other reasons for the popularity of solid surface material comprising acrylic binding alumina trihydrate filler in flat sheet is that the material is hard and provides high durability, flame resistance, ease of damage repair, ease of cleaning and sterilization, beauty, color stability, resistance to deterioration from common household chemicals and cleaning agents, and resistance to cracking, all attributes which are clearly also desirable in bowls, e.g., lavatories, bar sinks, shower pans and the like water basins. Additionally, solid surface countertops of acrylic filled with alumina trihydrate may be fabricated of several adhesively bonded seamed sections and yet appear as a single and continuous countertop due to the seams being visually imperceptible when properly applied.

In the past, the public was somewhat restricted in color choice in bowls (water basins) made of acrylic plastics filled with alumina trihydrate, and somewhat restricted in color choice for their matching countertop and water basin when both were made of acrylic plastics filled with alumina trihydrate. Thus, prior to the present invention, the public has not been provided the ability to make a matching countertop and water basin without being somewhat restricted in color choice, because bowls of acrylic filled with alumina trihydrate were not available in as wide of a variety of colors, color patterns and matrix colors as is available in flat sheet form.

Clearly from the above, it can be appreciated that bowls, i.e., lavatories, bar sinks, shower pans and the like water basins, made of acrylic filled with alumina trihydrate would or could be high quality bowls having many highly desirable attributes. It can also be appreciated that it is desireable to have a wide choice of colors and color matrix or color design patterns in solid surface material bowls of acrylic filled with alumina trihydrate, and this even if one was not trying to visually match a countertop to the sink. Furthermore, it can be appreciated that it is desirable to have or be able to economically produce bowls comprising acrylic filled with alumina trihydrate of virtually any color or color pattern or matrix for visually matching flat sheet stock comprising acrylic filled with alumina trihydrate which could be used to define a countertop, thereby allowing the matching of the countertop and bowl in material, durability and appearance. It can also be appreciated that economical considerations such as the cost of producing a bowl of acrylic filled with alumina trihydrate are always a concern.

The prior art, prior to the present invention has widely used machining such as saws, sanders, routers and the like to cut, trim and shape flat rigid sheet stock of acrylic filled with alumina trihydrate and containing colorants. It is believed high pressure water,jets and lasers have or can be used to cut or trim such material, although lasers will discolor the surface. The prior art, prior to the present invention has also seamed pieces of acrylic filled with alumina trihydrate using adhesives with the result being that the seams are imperceptible or virtually imperceptible. In the prior art, prior to the present invention, flat rigid sheet strips of acrylic filled with alumina trihydrate and including colorants have been heated to softening and bent along a single axis in the heated area to form long radius 90 degree (two-dimensional only) corner bends in otherwise flat sheets of the material, such bent corners being used lengthwise vertically installed in shower stalls as corners between flat sheet walling.

Possibly applicable prior art known to us, in addition to that above described, which might be considered relevant to the present invention generally falls into several catagories, with a first being prior art describing machining, i.e., mechanical material removal including cutting, sawing, sanding, drilling with drill bits and hole saws, milling and mechanical shaping such as with routers, molders, end mills and the like, particularly of solid surface material comprising acrylic filled with alumina trihydrate. Some prior art in the first category, i.e., machining, which is considered cumulative to the above described prior art is located in the following U.S. Pat. Nos. 4,958,888; 5,253,932; 5,359,817; 5,330,262; and 5,354,592, with each of these patents listing other prior art references which may be relevant to the present invention.

A second category pertaining to potentially applicable prior art relates to thermoforming or heating of rigid plastics to first soften them and then applying force for re-shaping the heated plastics. Prior art in the second category, i.e., thermoforming, which is considered somewhat cumulative to the above admitted to prior art is located in the following U.S. Pat. Nos. 3,172,928; 5,635,271; 5,340,526; 3,340,714; 4,239,727; 2,444,420; 3,464,418; 5,139,407; 2,590,221 and 4,136,226, with each of these patents listing other prior art references which may be relevant to the present invention. Admittedly the prior art in thermoforming details three-dimensional forming of heated sheets of various plastics families and including acrylics, however, it should be noted such prior art is not known to have suggested or anticipated the thermoforming of flat sheet stock comprising acrylic filled 55 to 85 percent by weight (significantly more than 60% alumina trihydrate weight is preferred for building materials) with alumina trihydrate into three-dimensional bowl shaped products. Additionally, it should be noted the vast majority of prior art of thermoforming processes restrain or otherwise clamp the peripheral edges of the heated sheet during forming, with this placing the material under high tension and shear loads. Furthermore, many of the prior art thermoforming processes of the above listed patents assume a high degree of elasticity in the heated plastics and thus advocate edge clamping and forming the plastics with sharp angular changes such as curved sidewalls turning sharply outward and extending horizontally at the top of the form or bowl to define a flange, or short radius 90 degree corners such as where a curved vertical sidewall joins a flat bottom panel of the thermoformed article.

A third category of prior art is related to manufacturing or mixing acrylics filled with alumina trihydrate and including colorants such as the aforementioned Duggins U.S. Pat. No. 3,847,865. U.S. Pat. No. 4,473,673 is considered cumulative to the prior art information in the Duggins U.S. Pat. No. 3,847,865 pertaining to casting of fluid materials, but is specifically directed to casting mixtures substantially of a polyester resins.

Additional related and cumulative prior art is of record in our Information Disclosure Statement herewith filed, but in our opinion, the prior art which might be considered relevant to the present invention does not describe or suggest the present invention.

SUMMARY OF THE INVENTION

The present invention provides or can provide, depending upon one's viewpoint, three-dimensional thermoformed bowls, e.g., bar sinks, lavatories, shower pans and the like comprising plastics, i.e., acrylic plastics as a binder filled 20 to 85 percent by weight with alumina trihydrate and preferably including colorants so as to provide high quality durable bowls, with the bowls provided in a wide choice of colors, matrix colors and appearances, and color design patterns, herein sometimes jointly referred to as "color" or "colors". The bowls when made of thick material are most readily defined in concavo-convex shapes due to an absence or with an absence of sharp or radical angular changes defined during thermoforming.

The present invention, from one viewpoint, is a product-by-process wherein a three-dimensional bowl comprising acrylic polymers (resins) binding a filler of alumina trihydrate of 20 to 85 percent by weight, preferably approximately 70% alumina trihydrate by weight (which is significantly more than 60%); the bowl being the product, is formed by the process of thermoforming from flat sheet stock of the same material which is preferably Corian™ type and brand of material.

From another viewpoint the present invention is economical and effective improved manufacturing processes or methods utilizing thermoforming to define three-dimensional bowls comprising acrylic plastics as a binder filled with alumina trihydrate and preferably including colorants so as to provide high quality durable bowls, with the bowls provided in a wide or expanded choice of colors for matching flat sheet stock of essentially the same material, and including those appearing with visually distinguishable particles and even further which include more than 60% and preferably approximately 70% alumina trihydrate, and most preferably of that material sold under the trademark name of Corian.

From yet another viewpoint the present invention is improved processes or methods for making a three-dimensional bowls of acrylic filled with alumina trihydrate and preferably including colorants with the three-dimensional bowl mounted to a countertop also comprising acrylic filled with alumina trihydrate and preferably including colorants and with both the bowl (sink, lavatory) and countertop appearing as a single structure after assembly, and even further with both the countertop and connected bowl of the same matrix color, e.g., fairly large colored pieces or particulate matter suspended in surrounding other colored material and/or generally translucent material and truly appearing to be a natural stone product such as granite or marble.

From still yet another viewpoint, the present invention is the teaching of manufacturing a bowl by firstly forming or defining a flat sheet or flat sheet blank comprising acrylic plastics (resins) filled with alumina trihydrate and preferably including colorants such as by casting, extruding or pouring a fluid mix into a sheet or blank shape, followed by solidification of the sheet or blank, then applying sanding and polishing to at least one wide flat side or surface of the rigid sheet or blank so as to bring it to a finished appearance and smoothness, followed by thermoforming the sheet or blank into a bowl shape wherein the previously sanded and polished surface (faced surface) is in the interior exposed in use surface of the bowl, reapplying sanding and polishing (touch-up sanding or re-facing) if needed in the interior of the bowl, then trimming the bowl shape top peripheral edge to greater evenness and defining a drain hole such as by cutting through the bottom thereof if the bowl is to be used as a water basin with drain, and if desired mounting the bowl such as with adhesives relative to a cut-out opening in a countertop such as a countertop made of acrylic plastics filled with alumina trihydrate. Both sides of the blank or sheet can be initially sanded and polished to a finished state, bearing in mind some colors cast, extrude or pour with basically finished surfaces, and touch-up sanding and polishing (re-facing) may then be applied after thermoforming to both the inner and outer bowl surfaces to be exposed in final application, such as might be the case if the bowl is a water basin atop a pedestal for example.

The variety of colors of the bowls economically provided by the present invention is generally equal to the variety of colors provided or which can be provided in flat sheet stock of acrylic filled with alumina trihydrate. The bowls of the present invention are or can be economically provided in virtually any color for matching flat sheet stock comprising acrylic filled with alumina trihydrate which could be used to define a countertop, thereby allowing, if desired, the matching of the countertop and bowl (sink) in both material and appearance, and in a wide variety of colors, or simply providing bowls such as lavatories, bar sinks and the like basins comprising acrylic plastics filled with alumina trihydrate in a wide variety of colors which could be used in conjunction with any suitable countertop defining materials or on a pedestal.

It should be noted that "bowl" as herein used is mainly directed toward a deep or deep drawn three-dimensional bowl, but it can also be used to describe a relatively shallow three-dimensional shape or raised-sided pan such as a shower pan, or the same structure inverted to be a table top both of which have a generally flat bottom between the raised surrounding peripheral sides and comprising acrylic binding a fill of alumina trihydrate.

A further understanding and appreciation of the invention will be gained with continued reading and with a review of the attached drawings.

BEST MODES FOR CARRYING OUT THE INVENTION

With reference now to the drawings in general for details of the principles of the invention, specific processes and products in accordance with the invention. We have discovered how to economically provide or manufacture bowls, e.g., sinks, bathroom sinks, bar sinks and lavatories and the like comprising plastics, e.g., acrylics as a binder heavily filled with alumina trihydrate (aluminum trihydrate) and including colorants so as to provide high quality durable bowls, and with the bowls provided in a wide choice of generally solid colors, matrix colors and color design patterns, sometimes herein jointly referred to as "color" or "colors". The variety of colors which we can economically produce in such bowls is basically equal to the variety of colors which can be or is produced in rigid flat sheet stock comprising acrylics as a binder heavily filled with alumina trihydrate and including colorants, and this includes those colors having large visually distinguishable particles of colorant or colored particles suspended generally uniformly throughout the translucent acrylic material inclusive of those intended to and actually simulating natural stone such as granite and or marble in appearance. "Visually" and the like is herein meant to mean with the un-aided human eye, not with microscope or the like needed. In accordance with the invention, such bowls are produced by a process considered to be, in short, a process or an improved process of forming a three-dimensional bowl shaped item, particularly concavo-convex bowls of the type comprising an acrylic binder with a filler of alumina trihydrate of 20 to 85 percent by weight; wherein the process includes thermoforming a flat sheet blank comprising an acrylic binder with a filler of alumina trihydrate of 20 to 85 percent by weight into a three-dimensional bowl such as a concavo-convex bowl shaped item.

Figure 1:
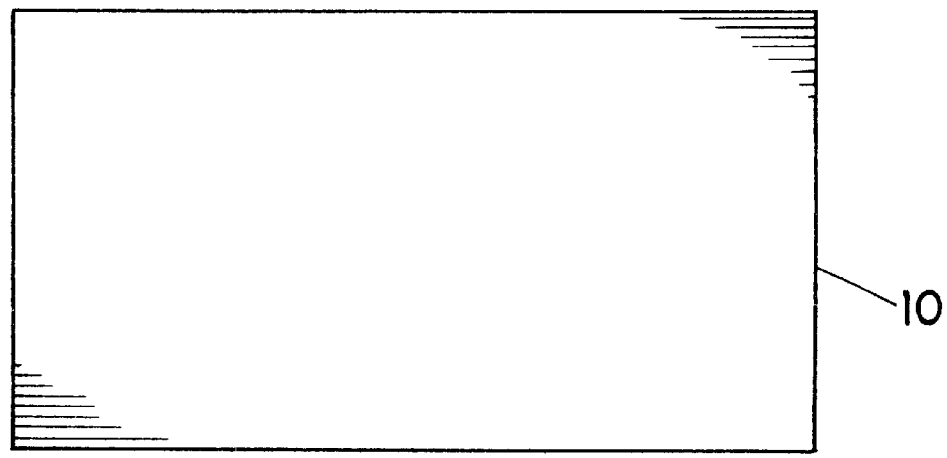
FIG. 1 is an illustration of a rectangular flat rigid sheet (bulk sheet or blank) comprising acrylics or acrylic plastics binding a filler of alumina trihydrate and which can contain colorants and visible particles as it is available from numerous manufactures or can be manufactured in accordance with the details provided in the aforementioned U.S. Pat. No. 3,847,865.
Figure 2:
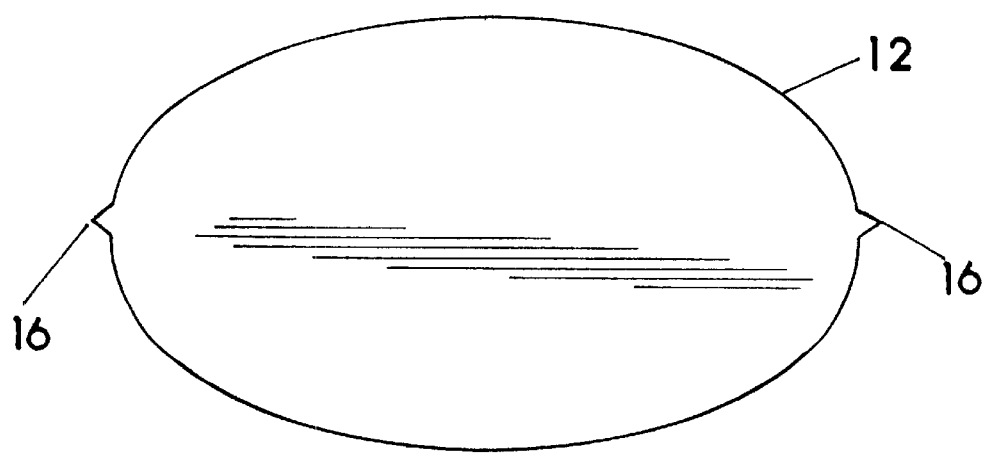
FIG. 2 shows a non-rectangular, specifically generally oval blank originally manufactured in such shape or cut as a blank from a bulk sheet or blank such as that shown in FIG. 1 and including two oppositely disposed indexing points.
Figure 3:
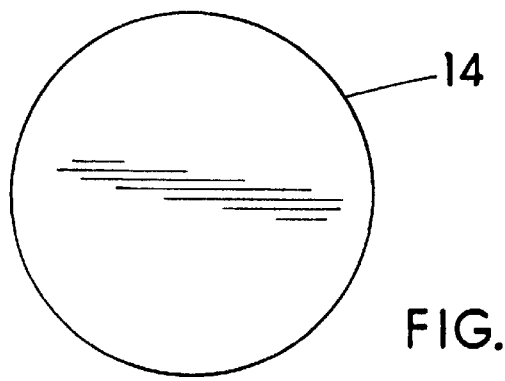
FIG. 3 shows a circular blank (non-rectangular) originally manufactured in such shape or cut as a blank from a bulk sheet such as that shown in FIG. 1.
Figure 4:
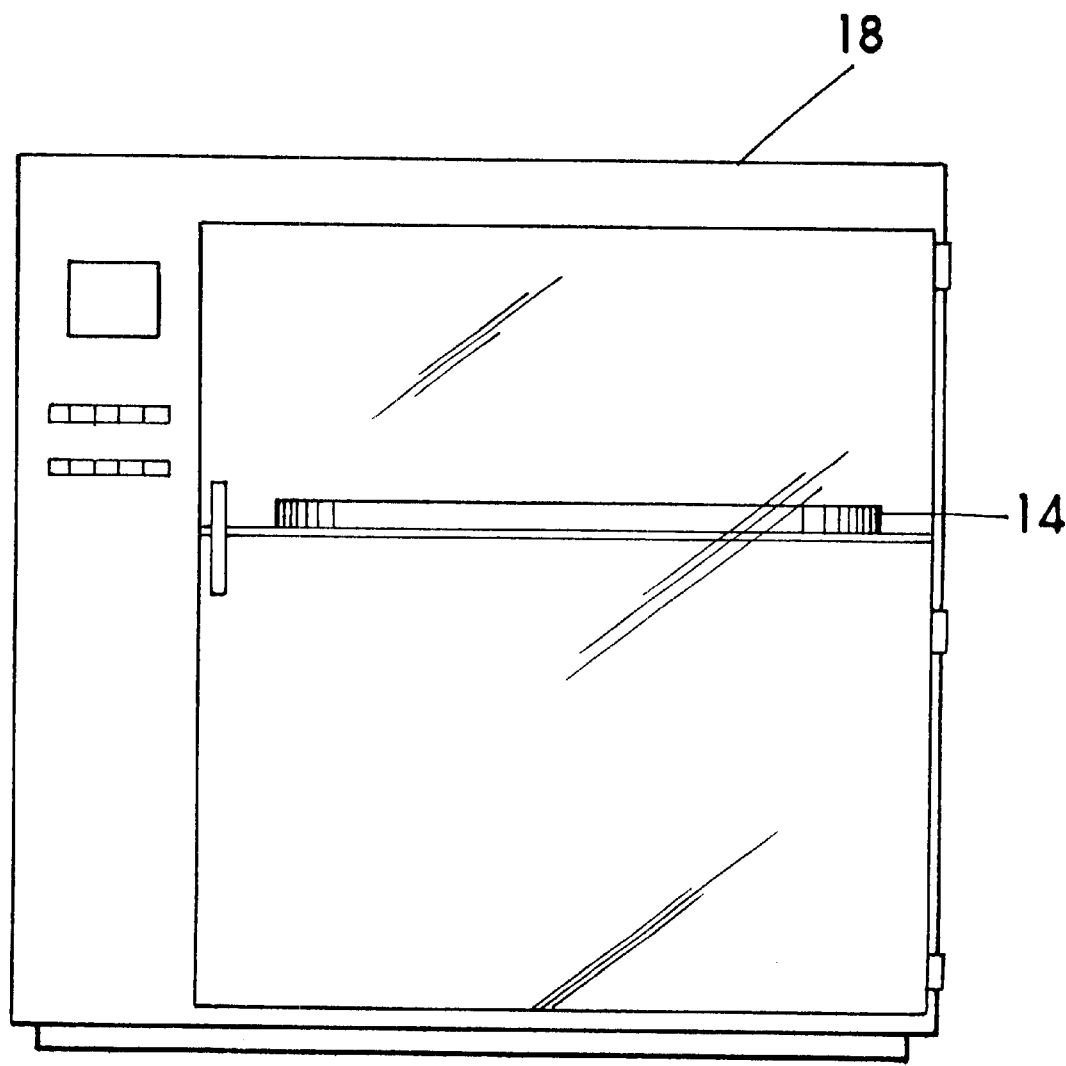
FIG. 4 shows a heating oven. A blank is shown through the oven glass door being heated to a condition of flexible softness.

The flat sheet blank begins rigid, with the process including the heating of the blank such as in a oven 18 to flexible softness prior to forming the blank. The forming or re-shaping of the heated blank can be accomplished in a rigid matched-mold compression or mechanical molding tool or die 44 such as that shown in FIG. 5, but is not limited to the use of rigid matched-molds. The blank can be of generally any color, color design pattern or color matrix selected from a rigid flat sheet 10 such as shown in FIG. 1 and cut from the bulk sheet or initially formed as a suitably sized and shaped blank. FIG. 2 shows an oval shaped blank 12, and FIG. 3 shows a circular blank 14. The blank can be cut from the bulk sheet 10, since most sheets of such material are sold in sizes too large and of a non-ideal shape relative to a desired bowl shape and size, or a flat blank such as 12 or 14 could be originally manufactured in proper size and shape thereby eliminating the need to "cut" the blank from a larger sheet. Blanking to a proper size blank, or otherwise defining a blank 12 or 14 not being any larger or significantly any larger than the amount of material needed to define the bowl not only may save material waste, but more importantly reduces stresses during thermoforming and thereby significantly aids in such material being thermoformed without significant visual changes appearing in the material, such as wrinkles, buckles and tears developing during forming, and residual stresses within the finished bowl are also minimized. The forming in a rigid matched-mold or any suitable mold (die) is with the peripheral edges of the heated blank unrestrained or not clamped and thus free to be moved inward during the reshaping of the flat blank into a three-dimensional bowl, and this to reduce tension loads applied to the heated blank during the forming or reshaping phase. The un-restrained edges of the blank during the forming is utilized because the heated solid surface material (acrylic filled with alumina trihydrate) generally does not stretch substantially without tearing, wrinkling or discoloring on the surface, and this due to the common high amount of alumina trihydrate and relatively small amount of acrylic normally therein.

The blank, 12 or 14 for example, prior to heating, includes two oppositely disposed wide sides with at least one of the wide sides smooth, whether initially cast, extruded or poured as a smooth surface, or made smooth by later sanding and polishing (facing) while in its rigid flat condition. The blank of solid surfacing material, prior to being heated, should or can be cut from flat sheet stock such as sheet 10 shown in FIG. 1 or otherwise formed to the approximate shape the bowl is to ultimately be, less the dishing. For example, although the blank is flat, and is cut from flat sheet stock of rigid solid surfacing material or initially manufactured as the blank, the flat sheet blank should be oval in outline as shown in FIG. 2 if the bowl is to be an oval shaped bowl or having a top oval outline, and likewise the blank should be cut or defined circular as shown in FIG. 3 if the bowl is to be a round or circular bowl in top outline, and the blank should be generally rectangular if used to define a rectangular shallow shower pan, i.e, the flat blank includes an outline shape generally commensurate with the desired bowl shape. Cutting of the blank from the larger sheet 10 can be accomplished with many processes and or tools including sawing and the use router cutting bits, and any other suitable ways.

The heating of the blank, such as in oven 18, prior to re-shaping should be to a fairly uniform temperature throughout, and a temperature in a range of approximately 270 to 340 degrees fahrenheit is normally suitable to bring the blank above the glass transition point, but the specific temperature can be varied within the scope of the invention and is somewhat dependant on the color of the blank and percentage of alumina trihydrate fill. A suitable thickness of blank is approximately ¼ to ½ inch in thickness for bowls such as lavatories and like water basins, however the thickness of the blank can be varied widely from this within the scope of the invention dependant upon numerous factors including desired finished strength of the bowl. Sheet material of approximately ¼ inch in thickness, as well as any other thickness, formed into a bowl in accordance with the invention can be further stiffened and strengthened by applying a relatively thick, dense and hard foam such as a rigid setting urethane foam to the surface of the bowl which is unseen in final use. Such foam can best be applied as a liquid to the bowl surface, wherein the foam will adhere to the surface and expand prior to hardening. The use of such stiffening foam is particularly useful for strengthening table tops and shower pans in accordance with the invention.

Generally speaking, numerous types of heating equipment may be used to heat the blanks to a condition of flexible softness. In practice, we have successfully used an electric convection oven 18 large enough to allow the insertion of the blank 12 or 14 for example into the oven to bring the blank to a proper temperature for allowing it to be molded into bowl shape. The blank can usually be heated to proper temperature within approximately 10 to 20 minutes in an oven pre-heated to around 400 degrees fahrenheit, but this time for heating as well as the oven pre-heat temperature can be varied within the scope of the invention based on numerous factors including color and material thickness of the blank. Too high of temperature in the oven or other heating device will burn the outer surface of the blank thus making it undesirable. Gas fired ovens will also function, and infra red heating equipment as well as hot air blowers and combinations thereof should also be feasible for heating the blanks 12 and 14. It is believed RF (radio frequency microwave) heating equipment might also be feasible for at least partly heating the blank. The final heated temperature of the blank should be generally or fairly uniform throughout the material to reduce or eliminate extreme temperature gradients which could cause wrinkling and tearing during molding, and lead to residual stresses within the completed bowl which could shorten the useful life of the bowl.

The rate of deformation of the heated blank within the molding tool can also effect residual internal stress, and in practice, deforming of the heated blank in the molding tool (to be detailed) such as mold tool 44 should be performed relatively slowly, such as over a 3 to 8 second or longer period of time (for example only) from the start of deformation to completion of the deformation, and thus the molding tool portion(s) which directly contact the blank should not be such that it can draw heat excessively quickly from the heated blank during the relatively slow deformation period. Prior to re-shaping, the heated blank is located relative to the molding apparatus i.e., matched-mold or other suitable die, such that the smooth surface side of the blank will be the concave or interior exposed surface when the bowl in a water basin or the like. The heated blank is properly indexed relative to the matched-mold die preferably such as by using lateral abutment indexing guides 34, shown in FIG. 5 for example, against the narrow side edge surfaces of the blank. The edges of the heated blank 12 or 14 are left un-clamped when deformed by the die, thereby allowing the blank edges to be moved or drawn inward to minimize tension loads during forming. After heating and then molding (re-shaping the blank into a three-dimension bowl) the bowl is cooled sufficiently to be self-supporting in its new shape, normally most readily by cooling the bowl while it is still retained and thus fixtured in the molding tool. After cooling, or shape-maintenance by fixturing, the bowl can be removed from the molding tool, the top edge 24 of the bowl 20 or 22 is trimmed to be flat and smooth or to greater evenness (or to whatever is desired), and this trimming should require the removal of only a small amount of material if the blank in its flat condition prior to molding was sized as previously described. The trimming of the top edge 24, which is normally needed to create greater evenness since some unevenness typically develops with reshaping of the blank, can be performed with conventional material removal processes and tools (machining) typically associated with cutting and trimming solid surface materials, such as by using a router bit or a milling machine for example. If the bowl is to be a water basin connected to drain plumbing, a drain hole 30 needs to be defined through the bottom 36 of the bowl, such a hole 30 can be readily achieved with machining with various types of tools, although other cutting arrangements can be used. The bowl, prior to final use application, should receive some sanding or re-facing in the interior surface or any surfaces of the bowl exposed in final use. Although the smooth surface of the blank which defines the concave interior surface of the bowl was initially smooth prior to heating the blank as described above, the process of thermoforming usually leaves a small amount of surface discoloration or "orange peel" like markings or unevenness from the material re-shaping, the markings or discoloration being shallow and typically limited mostly to those areas placed under the highest deformation or bend force. Therefor, re-facing, i.e., a light sanding and polishing in the interior of the bowl should normally be performed, preferably after all machining and cutting, the polishing meaning with very fine abrasives. Some colors require more sanding and polishing than others after thermoforming. In practice, we use a power sander such as an orbital palm sander having a foam-rubber pad which can deform to the curvatures of the interior of the bowl, and place sandpaper atop the rubbery pad to sand the interior of the bowl. The amount of needed sanding in the interior of the bowl varies widely dependant upon the color of the material and the shape of the bowl, i.e., curvatures and magnitude of deformation, however, usually a bowl can be sanded and polished by hand such as with a power sander in 1 to 10 minutes for example.

The blank, when cut (or originally made) to the preferred shape and size, can, if desired, be shaped to include a small outward extending V-shaped point 16 as shown in FIG. 2 on several edges for use as aids in indexing the heated blank to the molding tool. Indexing of the blank relative to the forming tool is accomplished by leaving the blank unrestrained to the degree that the peripheral edges of the blank can move inward during re-shaping in the mold, and therefore lateral abutting short blocks or an encircling ring serving as indexing guides 34 can be used mounted on the tool to abut against the narrow side or peripheral edges of the flat blank and index or register the blank to the tool. If the indexing guides 34 are facing upward such as about a female cavity of the tool (molding die), gravity can be used to hold the blank resting atop the tool across the cavity and between the indexing guides 34. An oval blank will be used with an oval shaped molding tool, and oval shapes include a length longer than the width, and thus indexing of the oval blank length with the length of the oval tool is important if the blank in not significantly larger than the amount of material required to define the bowl. The V-shaped indexing points 16 may be left off of the blank in situations where other suitable indexing components or arrangements are applied for guiding the proper positioning of the heated blank when inserted into the mold tool. Heating the blank when within the mold tool would not be outside of the scope of the invention, although we do not see any good reason at this time for such. Indexing guides applied to the female component of the molding tool is normally easier than applying such indexing components to the male component of the tool, assuming the female cavity is generally flat on top about the cavity, and even move favorably, facing upward to allow gravity to hold the blank. The indexing V-shaped points 16 on the blank shown in FIG. 2 are cut-off during the trimming of the top edge or rim of the bowl.

Figure 5:
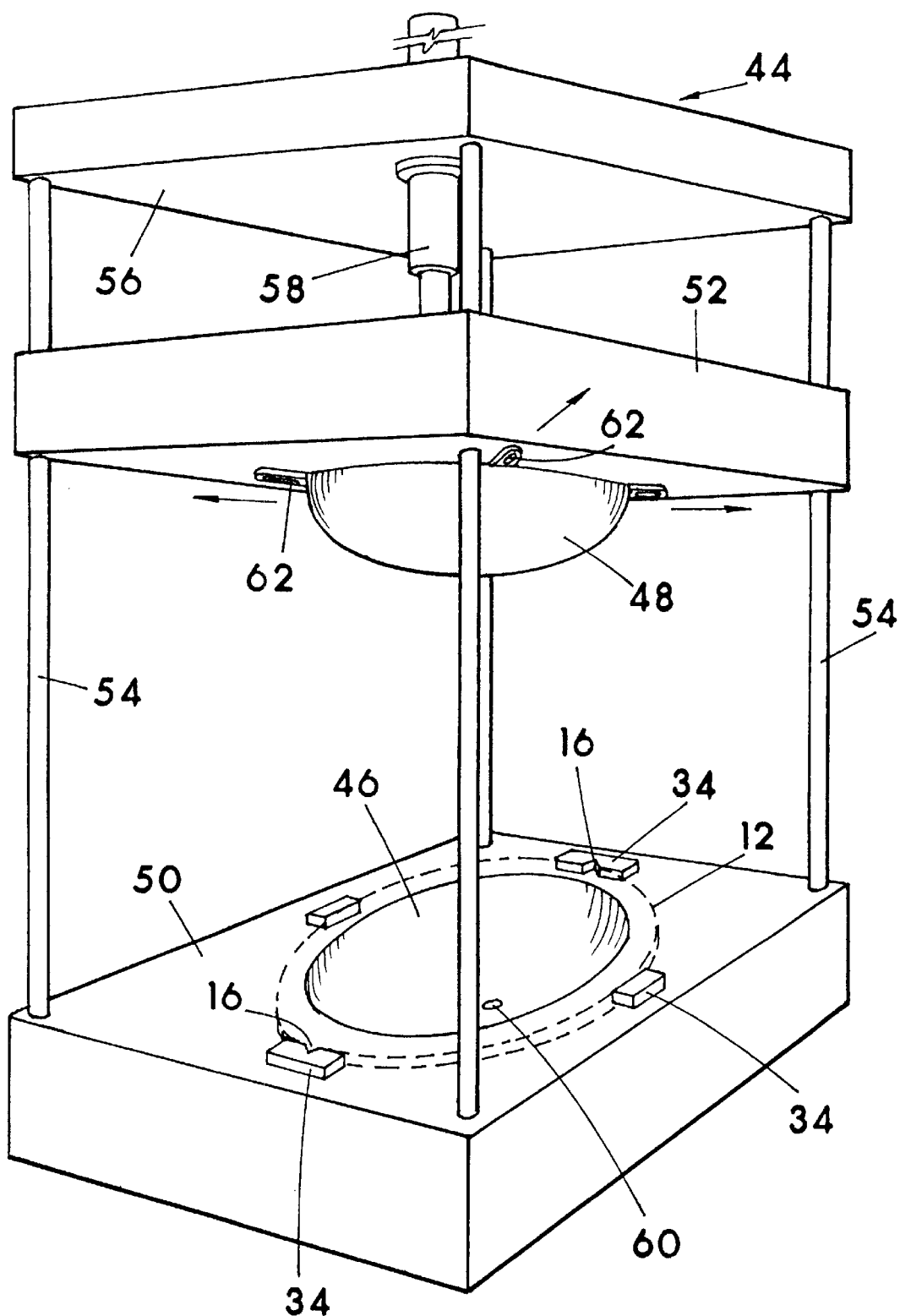
FIG. 5 shows a power actuated press or thermoform molding machine with a male mold component raised over an upward facing matched female mold component with female cavity. Also shown are raised indexing guides around the top perimeter of the female mold cavity for indexing a heated blank to the mold. An oval blank is shown in broken lines indexed upon the female mold. The male mold is shown raised.

As previously mentioned and as will described in further detail, we have successfully used matched-molds in a molding machine 44 each bowl-shaped mold portion of the molding tool being rigid with the female bowl-shaped cavity 46 aiming upward and the male bowl-shaped member 48 aiming downward, however other tool arrangements can be used for the re-shaping of the blank 12 or 14 into a bowl such as 20 or 22. In FIG. 5, the stationary female cavity 46 is shown in a rigid base 50, and the male rigid member 48 is shown attached or supported by a vertically movable base 52 slidably support on multiple vertical posts 54 which also support a stationary plate 56 above base 52. A linear extendable actuator 58 is shown connected between plate 56 and male base 52 as an example of a power-drive to move the male mold components relative to the female mold components. The mold tool could be an inverted male bowl-shaped rigid structure aiming upward which the heated blank is draped over followed by the application of a female mold component applied to the back side of the blank to compress the heated blank tightly against the inverted rigid male mold, and in this situation, a flexible diaphragm or bellows such as an inflatable bag-type arrangement might be used as the female component brought against the heated blank to press it onto the male member, or the female component could be a rigid structure of bowl-shape and the male mold member being flexible such as an inflatable diaphragm used to press the heated blank into the female mold cavity. When using matched-rigid dies, the size of the female cavity is basically the size of the rigid male mold component plus the thickness of the blank, which is in this example approximately ½ inch as previously mentioned. Although to date we have not attempted such, because we have been so successful with the matched-mold rigid tool, it is believed that the male mold component might be assisted by way of drawing a vacuum in the female mold cavity.

Figure 8:
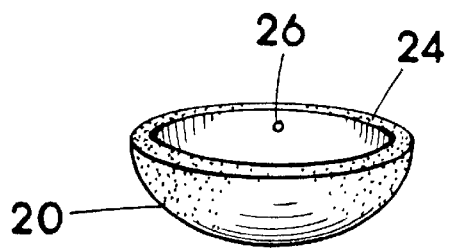
FIG. 8 shows a round bowl after removal from the mold of FIG. 7. An over flow drain hole in the upper sidewall of the bowl has been drilled (machined).
Figure 9:
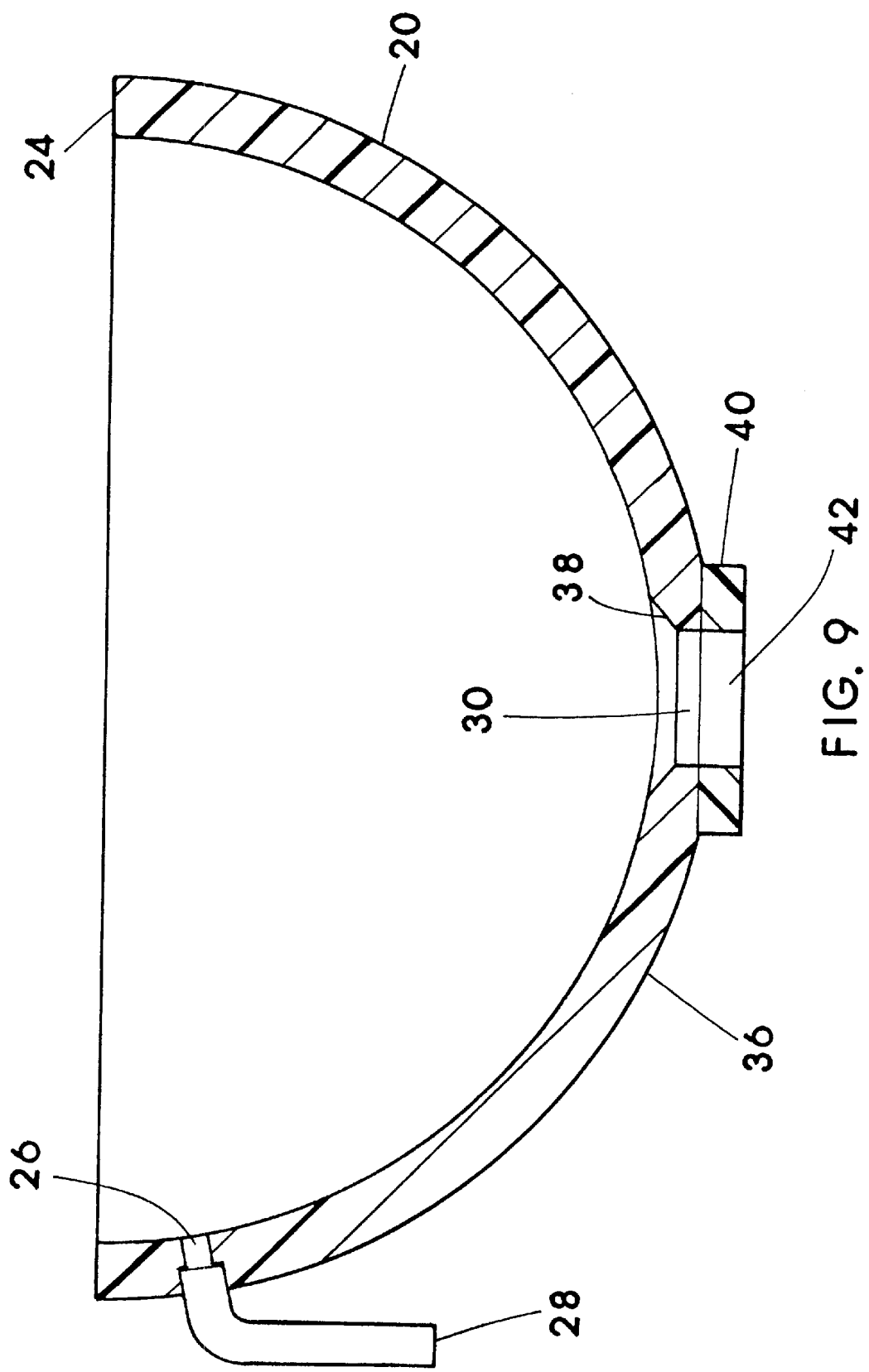
FIG. 9 shows in cross section a finished round bowl in the form of a lavatory or water basin in accordance with the present invention.
Figure 10:
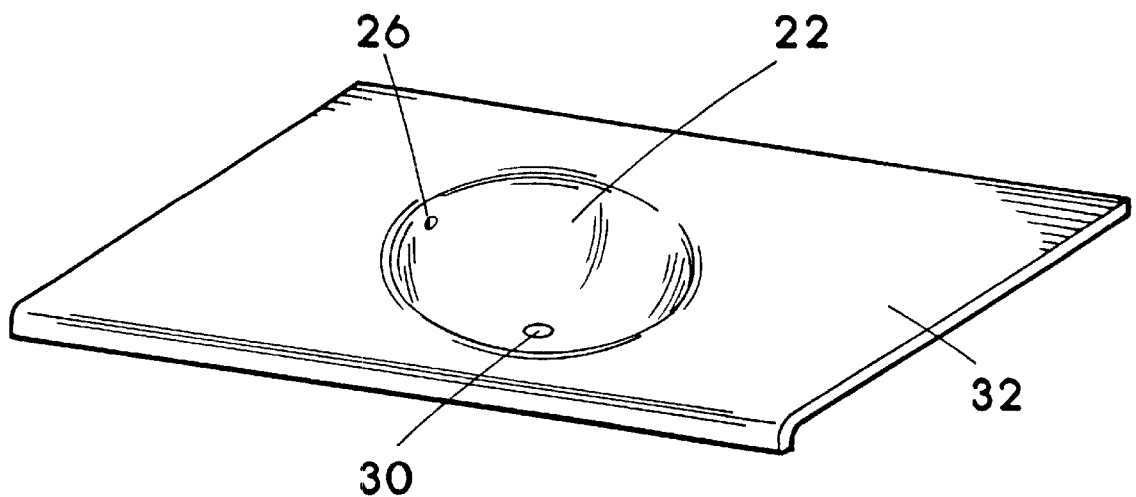
FIG. 10 shows a countertop with attached oval bowl as a lavatory (water basin), with both the countertop and bowl comprising acrylic plastics binding a filler of alumina trihydrate in accordance with the present invention.

The heated solid surface material blanks such as 12 and 14 are or can be deep-drawn or formed into relatively deep concavo-convex bowls with depths of at least ½ the length of the major axis at the top 24 open end of the bowl using thermoforming as herein described such as with mechanical or compression molds with a proper bowl shaped mold component or components. A circular bowl 20 such as is shown in FIG. 8 can be formed with an internal depth of 6 inches and an major diameter across the open top end of 12 inches for example only, and an oval bowl 22 such as shown in FIG. 10, prior to being adhered to a countertop 32, can be formed with a depth of 8 inches with a major axis length across the open top end of 16 inches for example only, and we consider these to be deep structures or deep drawn structures of bowls.

Figure 6:
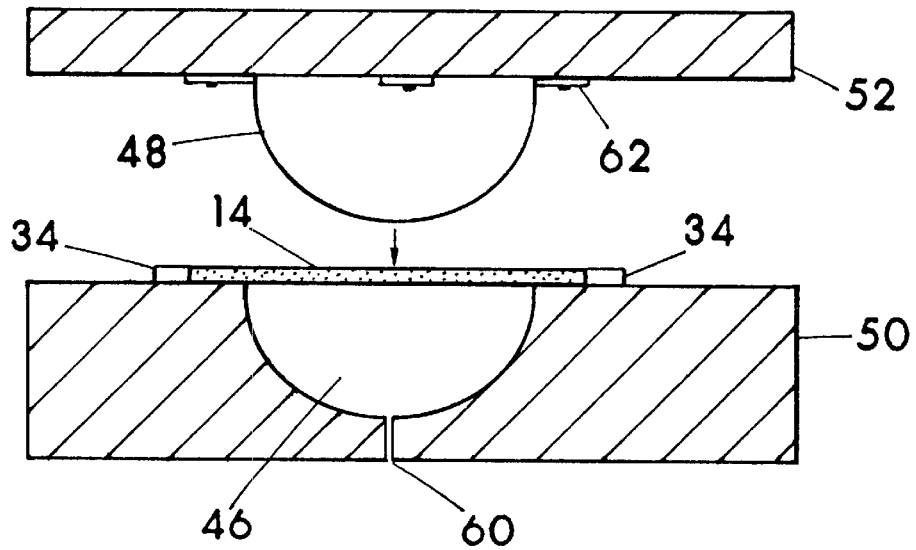
FIG. 6 illustrates a male mold member ready to be moved downward toward a blank resting upon a female mold which is shown in cross section. The shown molding tool and blank are circular in nature for forming round bowls as opposed to the oval arrangement of FIG. 5.
Figure 7:
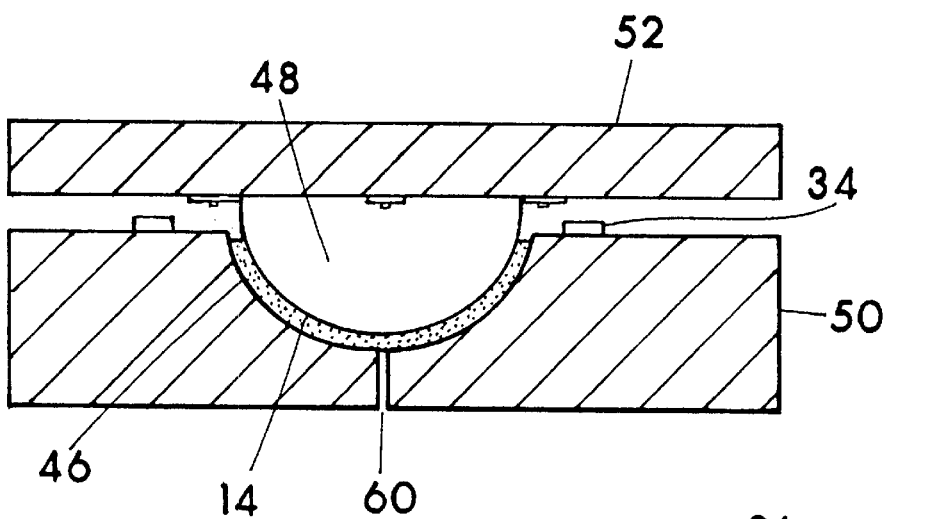
FIG. 7 shows the molding tool of FIG. 6 in the fully closed position deforming the preheated blank into a concavo-convex bowl shape. Note the unrestrained edges of the blank are shown having been drawn inward as the blank was formed between the mold components. Also shown is space between the top and bottom mold bases which allows upward flexing or bowing of the peripheral edges of the blank during the initial re-shaping thereof.

When using a rigid male mold component in conjunction with a rigid female mold component as shown in drawing FIGS. 5, 6, 7, alignment of the male component with the female component is important, and to this end in practice, although it is not required in all cases, we prefer to mount the rigid male portion of the mold so that it can be readily pushed laterally ¼ inch or so preferably in all lateral directions, or is laterally free-floating relative to the rigid female mold cavity to in effect self-align or self-adjust in position with the rigid female cavity of the mold and the blank during forming, the lateral pushing would be caused by the male mold abutting a partially formed blank such as in a slight inward rise in the blank, the abutting of the male component to the partly dished blank causing the "free-laterally-floating" male component of the tool to adjust itself in position within the female mold cavity and relative to the blank as the male component moves further into the female cavity. Preferably, in the final stages of the forming, the male mold component can press the heated blank tightly against the inner walls of the female cavity, and evenly or with even pressure, and with significant even pressure across the entire surface of the now concavo-convex blank, and this so that if any wrinkling, buckling or the like bowing in the blank material occurred during forming, the pressure (5 to 40 PSI for example) from the mold at its final closed position will have a tendency to press the bowed area out or back into uniform curvature with the balance of the now bowl shaped item. The self-adjusting male mold component, although generally never too far from center with the female cavity, helps allow the even pressure against the heated reshaped blank when pressed tightly against the walls of the female cavity, and this helps press-out any slight wrinkling or bowing which may have developed during the initial stages of forming. An example of a mounting arrangement to provide the self-adjusting of the male mold member 48 is to securely attach multiple horizontally extending mounting ears to male mold member or die 48, the ears having elongate and wide openings vertically therethrough, and using small diameter shanks having large heads securely mounted to the male mold support 52 with the shanks passing downward through the holes in the ears and the large heads of the shanks positioned against the downward surface of the ears and preventing the male mold member or die 48 from disengaging from support base 52, but with the connection being loose to allow lateral movement in all directions of the male mold member 48 as above described. 62 is applied in FIG. 5 to indicate such as connection which allows self-adjustment of male mold member 48, although any other suitable connection or mounting arrangements could also be used.

In further specific example of a preferred process we have successfully used, a rigid bowl shaped "free-floating" male mold portion or member 48 and a cooperatively shaped rigid female bowl shaped mold portion or cavity 46 of a matched-mold tool or die 44 are used, both mold components 46 and 48 being structurally rigid, and a flat sheet blank 12 or 14 of preheated solid surfacing material (acrylic filled with alumina trihydrate), properly sized and shaped is properly placed (located or indexed) into the open mold tool 44 between the male and female components of the tool, and without clamping or restraining of the edges of the heated solid surface sheet material, the blank is formed around the male or into the female component of the mold tool (depending upon one's vantage point) using compression by bringing the male mold component 48 toward the female cavity 46 with force to force the heated blank to conform to the bowl shape of the matched-tool or matched-die components. The smooth wide surface of the blank is toward or facing the male component or die 48, so as to reduce the above mentioned amount of touch-up sanding after re-shaping of the blank, and this is assuming the interior surface of the bowl is to be exposed when in use such as a water basin mounted in a countertop for example. When the tool 44 is closed, the male tool member 48 nests at least in part within the female tool cavity 46, with the heated blank 12 or 14 in this example sandwiched and preferably tightly sandwiched between the two commensurately shaped tool components 46 and 48. In practice, we prefer moving the male component of the mold tool inward (downward) into the stationary bowl shaped female component of the mold tool which faces upward, wherein when the heated blank is initially located between the male and female components of the tool prior to the male component being moved into the female component, the heated blank may be rested upon the female mold over the female cavity 46 and indexed by the indexing guides 34 against the narrow side edges of the blank 12 or 14. The indexing guides 34, which can be blocks or a single ring can be affixed to the female mold base 50 outward beyond the top starting edge of the female cavity 46. In practice, the male mold component can be raised and lowered relative to the female component by utilizing numerous different suitable power drives including the use of hydraulic, electric or pneumatic linear extendable actuators (rams) shown as 58 in FIG. 5 for example. Manually operated jacks of various types could also be utilized within the scope of the invention to open and close the molding tool.

As previously mentioned, the un-restrained edges of the blank during the forming is important, since the heated solid surface material (acrylic filled with alumina trihydrate) generally does not stretch substantially without tearing, wrinkling or discoloring, and this due to the high amount of alumina trihydrate and relatively small amount of acrylic normally therein, and therefore stretching of the material (placement under excessive tension or shear) is undesirable, and in order to reduce stretching (tension and shear forces), the edge of the blank is un-restrained so that when the male component of the mold moves into the female component of the mold pushing the heated blank deeply into the female mold cavity, the edges of the blank are fully free and able to be drawn inward toward the center of the tool whereby the blank is formed into a bowl shape absent significant stretching of the material. The blank should not be placed unreasonably under significant shear or tension loads.

After forming, the bowl shaped solid surface material is allowed to cool and thus stiffen or harden. In practice, we use a hole 60 through the bottom of the female mold cavity 46 to both allow the air to be expelled from the cavity 46 during downward movement of a blank, and also we can blow in cooling air to help reduce cooling time of the formed blank, although this is not critical to the invention. Cooling of the bowl should not be performed too quickly, otherwise excessive internal residual stress can develope within the bowl due to uneven cooling.

As previously mentioned, in order to use the bowl as a water basin capable of draining water, a water drain hole 30 is formed through the bottom 36 of the bowl using conventional material removal methods and tools such as machining such as a cutting bit on a router or with a mill for example. In practice for water basins such as lavatories made from ½ inch thick material, we prefer to cut or grind off the bottom exterior of the bowl to define a flat spot surrounding the bottom drain hole 30 (or where the drain hole is to be formed) in the bowl, and then glue-on "adhere" a reinforcing donut shaped ring 40 preferably also of solid surfacing material to the flat surface, the reinforcing ring 40 having a flat exposed bottom surface about a hole 42 through the ring 40 and aligned with the drain hole 30 through the bottom 36 of the bowl (sink), the exposed flat bottom surface of the ring 40 providing a flat and suitable surface for a plumbing pipe seal commonly used to connect a sink to a sewer waste line. The drain hole 30 in the bottom of the bowl can be cut or defined after the application of the reinforcing ring 40. The reinforcing ring 40 strengthens the area and in effect thickens the material in that area, which allows, if desired absent significant structural weakening, the forming such as by machining of a bevel 38 in the interior surface of the sink surrounding the bottom drain hole 30 into which the top flange of a conventional waste pipe connection to the sink can be applied in a flush or recessed position (non-protruding) relative to the interior bottom surface of the sink (water basin), with this allowing all water in the sink to fully drain under the pull of gravity. For a lavatory, an overflow drain hole 26 as is common in lavatories should or may also be formed through the upper sidewall of the bowl near the rim of the bowl to allow connecting an overflow drain fitting 28 and pipe for draining water away before the water has an opportunity to flow-over the top edge of the bowl or countertop. In practice, the hole 26 cut or drilled (machined) through the bowl sidewall for the overflow piping is preferably an multi-diameter hole so as to provide an abutment shoulder for pipe fitting 28 inserted into the hole 26 from the external side of the bowl to abut against and stop prior to entering into the bowl interior where it would be seen by a human user of the bowl (sink, lavatory). Overflow pipe fitting 28 can be glued in place in hole 26. Overflow piping from the overflow hole 26 in the sink extends external of the sink and will eventually terminate in a plumbing waste line beneath the bottom of the'sink when the sink is fully installed for use.

For the sake of positive clarity the invention can be viewed as a process or improved process for producing a three-dimensional or concavo-convex three-dimensional bowl shaped item or product such as a water basin comprising acrylic plastics with a filler of alumina trihydrate of 20 to 85 percent by weight and including colorant such as pigments and or pigmented particles and if desired, forming matrix colors so as to simulate stone in appearance, and with the process including cutting or otherwise defining a flat blank such as from a rigid flat sheet comprising acrylic plastics with a filler of alumina trihydrate of 20 to 85 percent by weight and including colorants, with the blank cut or otherwise defined to have an outline generally commensurate with the desired top outline shape of the bowl shaped item to be produced; and the blank including preferably at least one wide side smooth or finished in smoothness and appearance, and including heating the blank to flexible softness; if the heating of the blank is not performed in the molding tool, then locating and indexing the heated blank within a molding tool including a bowl-shaped tool portion; maintaining the peripheral side edges of the heated blank unrestrained and free to be moved inward when indexed to the bowl-shaped tool portion or the molding tool in general; applying force to the heated blank with the molding tool and forcing the heated blank toward the bowl-shaped tool portion sufficiently to force the heated blank into a bowl shaped item; cooling the bowl shaped item to a greater stiffness; removing the bowl shaped item from the molding tool; and if desired to make the bowl a sink or lavatory (water basin) having drain openings, trimming a top edge of the bowl shaped item to greater evenness or whatever shape is needed; cutting a drain opening through a bottom of the bowl shaped item; cutting an overflow opening near the top edge and through a side of the bowl, and re-facing by sanding and polishing with progressively finer abrasives the interior or exposed in-use surfaces of the bowl to greater smoothness or uniform appearance.

The invention can be viewed as a process for producing a bowl shaped water basin or lavatory comprising a filler of alumina trihydrate of 55 to 85 percent by weight in plastics, acrylic plastics being preferred, with the process including cutting a blank from rigid flat rectangular sheet comprising a filler of alumina trihydrate of 55 to 85 percent by weight in plastics; the blank being cut into a flat shape generally commensurate with the desired top outline shape of the bowl; heating the blank to flexible softness; locating the heated blank within a two part molding tool including a female cavity portion of the tool which is bowl shaped generally commensurate with the desired shape of the bowl; locating the heated blank over the female cavity portion of the tool while maintaining peripheral side edges of the heated blank unrestrained so that the side edges are free to be moved inward; moving a second portion of said two part molding tool into contact with said heated blank and pressing the second portion of the tool against the heated blank sufficiently and in a proper direction to press the heated blank into the female cavity portion sufficiently to reshape the heated blank into a bowl shaped item; cooling the bowl shaped item to a greater stiffness so its self-supporting in shape; removing the bowl shaped item from the two part molding tool (if it wasn't fixtured and removed earlier); machining a top edge of the bowl shaped item to greater evenness; machining a drain opening through a bottom of the bowl shaped item; machining an overflow opening near the top edge and through a side of the bowl shaped item; sanding, if need be, the exposed surfaces of the bowl to increase uniformity in appearance and smoothness.

It should be noted that not all sinks, particularly kitchen style sinks for example, include overflow drain holes.

Figure 11:
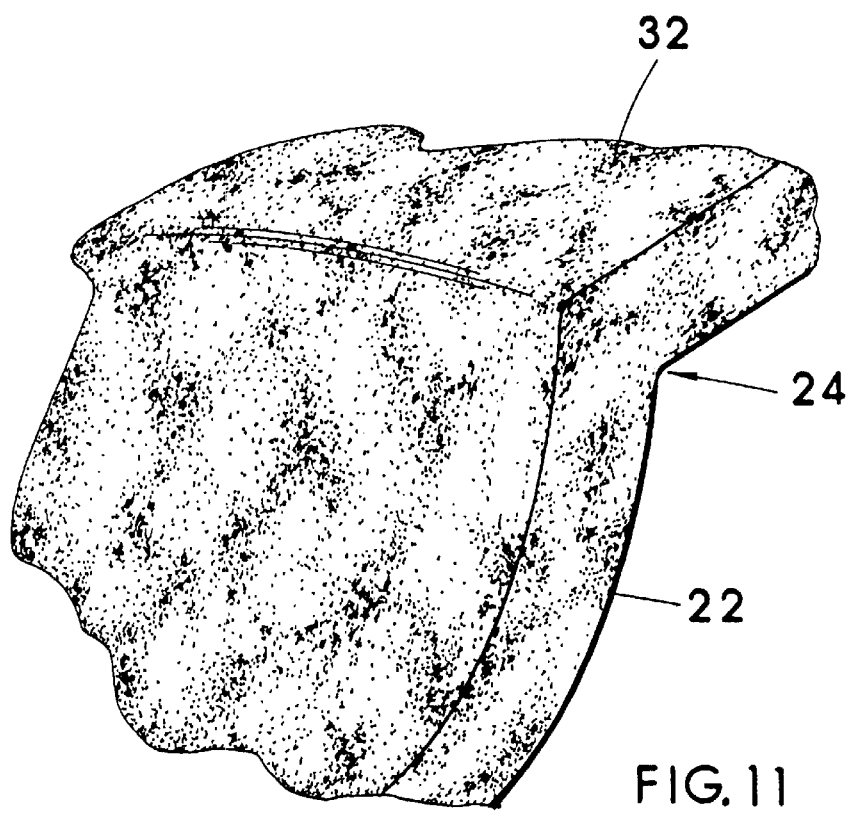
FIG. 11 is an enlarged fragmentary view of the FIG. 10 countertop and bowl assembly and illustrating a matrix color or matrix appearance intended to appear as marble or granite. Visually distinguishable particles are shown. Our process as herein taught can be used to form Corian™ brand material as shown, which means that while that which is shown in FIG. 11 as well as FIGS. 1–10 as the blank or bowl material can be, at least from one viewpoint, considered to be Corian™ brand material.

The trimming of the top edge of the bowl to being a flat smooth surface or a more even surface as previously described allows an improved appearance and also the basically finished bowl to be abutted to the underside of a countertop having a sink cut-out with a close or tight fit, and with such abutment aligning the bowl at a proper and desired attitude (tilt or non-tilt) relative to the countertop such as 32 and the bottom drain hole 30 so that all water can flow from within the bowl. To install such a bowl (sink or lavatory) on a countertop such as countertop 32 of FIG. 10, the bowl which is oval bowl 22 in FIG. 10 (the process is the same for a round bowl 14) is centered with the sink cut-out, i.e., large hole, the sink cut-out being slightly smaller than the inside diameter of the bowl so the countertop overhangs the bowl when initially mounted. The sink-cut is shown in FIG. 10 in a finished state with bowl 22 mounted to the countertop 32. A bead of proper liquid adhesive is applied to the top edge 24 (rim) of the bowl 22 or underside of the countertop 32 (or both) prior to abutment of the sink with the back side of the countertop 32, clamping pressure is then applied until the adhesive cures. Then the countertop material surrounding the sink cut-out can be removed with a router and a proper cutting bit up to the inside surface of the bowl, followed by sanding and polishing which when properly performed, will render the seam between the bowl 22 and the countertop 32, if both of the same color, imperceptible or virtually imperceptible, and if the countertop and the bowl are both made of solid. surface material of the same color and or color with design patterns (color matrix) therein as illustrated in FIG. 11, the countertop and bowl will appear as a single one-piece structure, or in other words will appear seamless and made of one component, with the bowl not appearing to be an add-on to the countertop, and if both countertop and bowl are of a same matrix color simulating in appearance the look of natural stone, again as shown in FIG. 11, then the assembly will have the visual appearance of being a one-piece stone structure. FIG. 11 is a fragmentary view of that shown in FIG. 10 and is intended to illustrate a granite stone appearance. The present invention allows for the economical formation of such a one-piece appearing structure (countertop and sink) appearing to be stone such as granite or marble. It should be noted that the blank used to make the bowl (sink) could be cut from the end of a long rigid sheet, the balance of the sheet used to define the countertop, and since the sinks or bowls made in accordance with the invention are not significantly altered in appearance, other than being reshaped, the countertop and sink can be a perfect or nearly perfect match if desired.

And so from one vantage point the invention can be viewed as an improved process of producing a countertop with attached bowl shaped sink such as a lavatory or bar sink or the like of the type wherein both the countertop and sink comprise plastics preferably acrylic polymers with a filler of alumina trihydrate of 20 to 85 percent by weight, and the countertop includes a sink cut-out opening, with the improvements comprising thermoforming of the sink into concavo-convex bowl shape from a flat sheet of plastics preferably acrylic polymers with a filler of alumina trihydrate of 20 to 85 percent by weight prior to attaching the bowl shaped sink to the underside of the countertop and surrounding the sink cut-out, and more specifically using a rigid flat blank comprising plastics preferably acrylics with a filler of alumina trihydrate of 20 to 85 percent by weight; the blank having two oppositely disposed wide sides with at least one of the wide sides being smooth or of a generally finished nature; heating the blank to flexible softness; locating the heated blank within a thermoform molding tool; maintaining peripheral side edges of the heated blank unrestrained in the thermoform molding tool so that the side edges are free to be moved inward; actuating the thermoformed molding tool sufficiently to form the heated blank into a bowl shaped sink wherein the smooth side of the blank is the interior or concave surface of the bowl shaped sink; cooling the bowl shaped sink to a greater stiffness; removing the bowl shaped sink from the molding tool; machining a top edge of the bowl shaped sink to greater evenness; defining a drain opening through a bottom of the bowl shaped sink such as by machining; sanding and polishing in the interior surface of the bowl if needed, adhering the top edge of the bowl shaped sink to an underside of the countertop and surrounding the sink cut-out opening in the countertop, the adhering being through the use of adhesives. Significantly more than 60% alumina trihydrate in the plastics by weight of the material, with the plastics being primarily acrylics is preferred for high durability.

Clearly some of the herein provided steps can be re-arranged in order or in some cases completely eliminated or defined more narrowly within the scope of the invention.

Although we have very specifically described best modes for carrying out the invention and provided many examples applicable thereto, the specification should not be used to overly limit the scope of the invention, as the true scope of the invention should be determined by the broadest possible reasonable interpretations and meanings of the claims and the words of the claims.

We claim:

1. A process for producing a durable three-dimensional bowl shaped product, said process comprising thermoforming, into said bowl shaped product, a planar blank comprising plastics binding a filler of alumina trihydrate of 20–85 percent of the total blank weight, the thermoforming including heating the blank to generally uniform temperature and softness, and further,
   the heated blank arranged and compressed in a compression molding tool with unrestrained edges allowed to be drawn inward during the thermoforming of the heated blank in the compression molding tool, the unrestrained edges for reducing stresses relating to tension.

2. A process for producing a bowl useful as a water basin and comprising acrylic plastics binding a filler of alumina trihydrate comprising 55 to 85 percent by weight of the bowl; the process including providing a non-rectangular rigid flat sheet blank comprising acrylic plastics binding a filler of alumina trihydrate 55 to 85 percent by weight of the blank; thermoforming the blank into a bowl, the thermoforming including allowing the edges of the blank to be drawn inward during transition from the flat sheet blank into the bowl; and then defining at least one drain hole through a bottom of the bowl.

3. A process according to claim 2 further including trimming of a top edge of the bowl to a condition of increased evenness.

4. A process according to claim 3 further including sanding an exposed interior surface of the bowl.

5. A process for producing a three-dimensional non-rectangular bowl useful as a water basin and comprising acrylic plastics binding a filler of alumina trihydrate of 20–85 percent by weight; wherein the steps comprise producing a non-rectangular non-laminated flat sheet blank comprising acrylic plastics binding a filler of alumina trihydrate of 20–85 percent by weight;
thermoforming the blank into a non-rectangular three-dimensional bowl utilizing heating to bring the blank to generally uniform temperature and softness throughout; applying force, with a two-part compression molding tool, to the heated blank to force the heated blank to re-shape while maintaining peripheral edges of the heated blank free to move inward as the force for the re-shaping is applied by the compression molding tool to force the blank into the three-dimensional bowl;
trimming a top edge of the three-dimensional bowl to a condition of increased evenness;
providing at least one drain hole positioned to be through a bottom of the three-dimensional bowl.

6. A process according to claim 5 further including
cutting a bevel in an exposed interior surface of the three-dimensional bowl and surrounding said drain hole, said bevel positioned for receiving a flange of a waste pipe connection to the bowl, wherein the flange can reside in the bevel in a non-protruding position;
re-facing, using abrasives, the exposed interior surface of the three-dimensional bowl.

7. A process according to claim 6 further including
affixing a reinforcing ring having a hole therethrough to a bottom exterior surface of the three-dimensional bowl with the hole of the reinforcing ring surrounding said drain hole.

8. A process according to claim 7 including cutting an overflow opening near the top edge and through a sidewall of the three-dimensional bowl.

9. A process for producing a durable bowl shaped water basin comprising plastics with a filler of alumina trihydrate of 20–85 percent by weight and including the steps of (a) cutting a blank from a rigid flat rectangular sheet comprising plastics with a filler of alumina trihydrate of 20–85 percent by weight and having a thickness in a range of approximately ¼ to ½ inch; the cutting of said blank including cutting said blank into a non-rectangular flat shape outline, the outline generally commensurate with a desired non-rectangular top outline shape of the bowl to be produced with the process; said flat rectangular sheet and thereby said blank cut from said flat rectangular sheet having at least one finished surface;

(b) heating said blank to flexible softness and general uniform temperature throughout said blank;

(c) locating the blank within a compression molding tool including a rigid female cavity portion and a male portion of the tool, the tool portions being bowl shaped generally commensurate with the desired shape of the bowl to be produced; the locating of the blank including positioning the blank over the female cavity portion of the tool and maintaining peripheral side edges of the blank unrestrained so that the side edges are free to be moved inward when the heated blank is formed into bowl shape; the locating of the blank relative to the female cavity portion further including positioning the at least one finished surface of the blank toward the male portion of the tool so as to be an exposed interior surface when the blank is formed into bowl shape;

(d) moving at least one of the portions of the compression molding tool relative to the heated blank and pressing the heated blank into said female cavity portion and tightly compressively sandwiching the heated blank between the female cavity portion and the male portion sufficiently to reshape the heated blank into bowl shape;

(e) cooling the bowl shape to a greater stiffness;

(f) removing the bowl shape from the compression molding tool;

(g) trimming a top edge of the bowl shape to greater evenness;

(h) cutting a drain opening through a bottom of the bowl shape;

(i) sanding and polishing the at least one finished surface which became the exposed interior surface of the bowl shape when the blank was formed in the compression molding tool.

10. A process according to claim 9 further including providing a bevel in the exposed interior surface of the bowl shape, said bevel for receiving a flange of a waste pipe connection, wherein the flange can reside in the bevel in a non-protruding position;

affixing a reinforcing ring having a hole therethrough to an exterior surface of the bowl shape with the hole of the reinforcing ring surrounding said drain hole, whereby the underside area of the bowl shape provided with said bevel is reinforced by said ring.

11. A process for producing a bowl shaped water basin from solid surfacing material; said process comprising (a) providing a blank of rigid solid surfacing material having a thickness in a range of approximately ¼ to ½ inch; the providing of said blank including shaping said blank into a non-rectangular flat shape outline with the outline generally commensurate with a desired non-rectangular top outline shape of the bowl to be produced; said blank having at least one finished surface;

(b) heating said blank to flexible softness and of uniform temperature throughout said blank;

(c) locating the heated blank within a compression molding tool including a rigid female cavity portion and a male portion of the tool which are bowl shaped generally commensurate with the desired shape of the bowl to be produced; the locating including positioning the heated blank over the female cavity portion of the tool and maintaining peripheral side edges of the heated blank unrestrained so that the side edges are free to be moved inward when the heated blank is formed into bowl shape; the locating of the heated blank relative to the female cavity portion further including positioning the at least one finished surface of the heated blank toward the male portion of the tool so as to be an exposed interior surface when the blank is formed into bowl shape;

(d) moving at least one of the portions of the compression molding tool relative to said heated blank and pressing the heated blank into said female cavity portion and tightly compressively sandwiching the heated blank between the female cavity portion and the male portion sufficiently to reshape the heated blank into bowl shape;

(e) removing the bowl shape from the compression molding tool;

(f) trimming a top edge of the bowl shape to greater evenness;

(g) cutting a drain opening through a bottom of the bowl shape;

(h) re-facing the at least one finished surface which became the exposed interior surface of the bowl shape when the blank was formed in the compression molding tool.

12. A process according to claim 11 further including machining a bevel in the exposed interior surface of the bowl shape, said bevel for receiving a flange of a waste pipe connection to the basin, wherein the flange can reside in the bevel in a non-protruding position allowing for full drainage of the water basin;

affixing a reinforcing member having a hole therethrough around said drain opening to an exterior surface of the bowl shape with the hole of the reinforcing member around with said drain hole, whereby the area of the bowl shape provided with said bevel is reinforced by said ring.

13. A process for producing a durable three-dimensional bowl shaped product of acrylics and alumina trihydrate based solid surface material, said process including the steps of thermoforming a blank of acrylics and alumina trihydrate based solid surface material into said three-dimensional bowl shaped product; said thermoforming including uniformly heating the blank to softness and then reshaping the heated blank into the bowl shaped product utilizing a two-part compression molding tool, the reshaping occurring with peripheral edges of the blank free to move, whereby tension loads can be reduced during the reshaping;

trimming a top edge of the bowl shaped product to greater evenness; and re-facing surfaces of the bowl shaped product which are exposed in-use.

14. A process for producing a durable three-dimensional bowl shaped product according to claim 13 including providing said blank with an outline generally commensurate with a desired top outline shape of the bowl shaped product to be produced.

15. A process for producing a durable three-dimensional bowl shaped product according to claim 14 including providing said blank with an oval outline generally commensurate with a desired oval top outline shape of the bowl shaped product to be produced.

16. A process for producing a durable three-dimensional bowl shaped product according to claim 14 including providing said blank with a circular outline generally commensurate with a desired circular top outline shape of the bowl shaped product to be produced.

17. A process for producing a durable three-dimensional bowl shaped product according to claim 13 including providing said blank of acrylics and alumina trihydrate based solid surface material having a color matrix including visually distinguishable particles.

* * * * *